(12) United States Patent
Zheng et al.

(10) Patent No.: US 7,199,071 B2
(45) Date of Patent: Apr. 3, 2007

(54) CATALYST COMPONENT FOR POLYMERIZATION OF OLEFINS, CATALYST CONTAINING THE COMPONENT AND USE OF THE SAME

(75) Inventors: Ying Zheng, Beijing (CN); Zhe Guan, Beijing (CN); Shuke Jiao, Beijing (CN); Bo Qiu, Beijing (CN); Xi Wang, Beijing (CN)

(73) Assignees: China Petroleum & Chemical Corporation, Bejing (CN); Beijing Research Institute Of Chemical Industry, Bejing (CN)

( * ) Notice: Subject to any disclaimer, the term of this patent is extended or adjusted under 35 U.S.C. 154(b) by 213 days.

(21) Appl. No.: 10/450,555

(22) PCT Filed: Dec. 14, 2001

(86) PCT No.: PCT/CN01/01626

§ 371 (c)(1), (2), (4) Date: Nov. 17, 2003

(87) PCT Pub. No.: WO02/051880

PCT Pub. Date: Jul. 4, 2002

(65) Prior Publication Data

US 2004/0072679 A1    Apr. 15, 2004

(30) Foreign Application Priority Data

Dec. 14, 2000 (CN) .............................. 00128268 A

(51) Int. Cl.
- *B01J 31/00* (2006.01)
- *B01J 37/00* (2006.01)
- *C08F 4/60* (2006.01)
- *C08F 4/02* (2006.01)

(52) U.S. Cl. ...................................... 502/103; 526/72
(58) Field of Classification Search ................ 502/103; 526/72
See application file for complete search history.

(56) References Cited

U.S. PATENT DOCUMENTS

| | | | | |
|---|---|---|---|---|
| 3,766,091 A | * | 10/1973 | Vandenberg | 502/156 |
| 4,399,054 A | | 8/1983 | Ferraris et al. | |
| 4,536,484 A | * | 8/1985 | Lacombe et al. | 502/62 |
| 4,784,983 A | * | 11/1988 | Mao et al. | 502/111 |
| 5,106,804 A | * | 4/1992 | Bailly et al. | 502/108 |
| 5,476,825 A | | 12/1995 | Fushimi et al. | |
| 5,616,665 A | | 4/1997 | Jejelowo et al. | |
| 5,623,033 A | * | 4/1997 | Kioka et al. | 526/124.8 |
| 5,629,390 A | * | 5/1997 | Nishimura et al. | 526/114 |
| 5,654,248 A | * | 8/1997 | Kioka et al. | 502/108 |
| 5,663,130 A | * | 9/1997 | Emert et al. | 508/506 |
| 5,698,487 A | | 12/1997 | Sacchetti et al. | |
| 5,824,754 A | * | 10/1998 | Fiasse et al. | 526/141 |
| 6,342,622 B1 | * | 1/2002 | Arts et al. | 556/53 |
| 6,391,989 B1 | * | 5/2002 | Bohnen et al. | 526/134 |
| 6,500,908 B1 | * | 12/2002 | Bohnen et al. | 526/160 |
| 6,841,498 B2 | * | 1/2005 | Kong et al. | 502/103 |

* cited by examiner

*Primary Examiner*—J. A. Lorengo
*Assistant Examiner*—Jennine Brown
(74) *Attorney, Agent, or Firm*—Blakely Sokoloff Taylor & Zafman

(57) ABSTRACT

The present invention relates to a catalyst component suitable for olefin (co)polymerization, which comprises an aluminoxane supported on magnesium halide and contains more than 5% by weight of aluminum. The catalyst component according to the present invention is obtained by contacting an aluminoxane compound and a magnesium compound in the presence of a multifunctional organic compound. The catalyst comprising said component and metallocene shows good activity and consumes less amount of aluminoxane in the process of olefin polymerization. The polymer prepared by using said catalyst has an improved particle morphology and a narrow particle distribution.

19 Claims, No Drawings ns,071 B2

CATALYST COMPONENT FOR POLYMERIZATION OF OLEFINS, CATALYST CONTAINING THE COMPONENT AND USE OF THE SAME

TECHNICAL FIELD

The present invention relates to a catalyst component for olefin (co)polymerization, a catalyst containing the catalyst component and the use of said catalyst in olefin (co)polymerization.

BACKGROUND ART

It is well known that the homogeneous metallocene catalyst comprising a metallocene compound and an activation agent is the most important new generation polyolefin catalyst following the Ziegler-Natta catalyst. Compares to the traditional Ziegler-Natta catalyst system, this kind of catalyst possesses many outstanding performances such as ultrahigh catalytic activity, narrow molecular weight distribution of the polymer, uniform composition distribution of the copolymer, and the possibility to control the stereochemical microstructure, etc. Although the homogeneous metallocene catalyst has so many outstanding performances, two problems have been come across in the industrial application that need to be urgently solved: one is the solubleness of the catalyst in the preparation medium and the liquid medium for polymerization reaction, the severe phenomenon to adhere the autoclave in the polymerization process, and the difficulty to control the particle morphology, resulting in the difficulty to be used in gas phase or slurry polymerization; the other is the need to use great amounts of promoters (mainly methyl aluminoxane, abbreviated as MAO) to achieve higher catalytic activity, causing a high production cost of the catalyst.

Presently, the major approach to reduce the production cost of the metallocene catalyst is activating the molecule of the catalyst with a substance having strong Lewis acidity to reduce the amount of promoters. However, this approach cannot improve the morphology of the polymer.

In order that the metallocene catalyst can be used in the gas phase polymerization process, the prior an uses the method of supporting the metallocene catalyst on a support to improve the particle morphology of the polymer. The support once used includes inorganic oxides the surface of which contains hydroxyl such as silica, alumina, etc, or porous polymer supports such as polyethylene, polypropylene and polystyrene. However, the costs of these supports are all rather high, and the particle morphology of the prepared polymer is not desirable, so an attempt has been made to use magnesium halide as the support for supporting metallocene compounds. For example, CN 1054776A discloses the use of magnesium chloride as the support of metallocene compounds, which is obtained by the reaction between tert-butyl chlorine and dibutyl magnesium in an aliphatic hydrocarbon solvent, and an electron donating compound such as isopentyl ether needs to be added, followed by impregnation of the support in an aromatic solvent containing metallocene compounds to yield the supported catalyst. A promoter, MAO solution in toluene, needs to be added when polymerization is carried out and the amount is Al/Zr=2500.

EP 878,483 and EP 879,484 disclose using the complex compound of magnesium chloride prepared by the decomposition of the Grignard reagent with tetrahydrofuran as the support and subsequently impregnating the support in a tetrahydrofuran solution dissolving a metallocene compound to yield the supported catalyst. A MAO solution in toluene also needs to be added when polymerization is carried out and the amount is Al/Zr=5000.

CN 1130914A discloses using spherical alcoholate of magnesium chloride as the raw material of the support; which is first physically dealcoholized with hot nitrogen till an alcohol content of 10–45%, and then the remaining alcohol is removed with an excessive alkyl aluminum compound (such as triethyl aluminum tri-isobutyl aluminum, trimethyl aluminum) to yield the support which is impregnated in the solution of the complex formed from a metallocene compound and alkyl aluminum or MAO to yield the supported catalyst. A great amount of MAO also needs to be added when polymerization is carried Out, and the amount is Al/Zr=4000.

As stated above, the prior aft typically uses impregnation method to directly support the main catalyst component, metallocene compound, on the magnesium halide support or treats the magnesium compound support first, and then supports the metallocene compound or its complex with alkyl aluminum or MAO on the treated support. When used in the olefin polymerization, a great amount of soluble MAO is added. Although a highly active catalyst can be obtained the use of a great amount of MAO not only results in an increase in the cost, but also dissolves the metallocene compound having been supported, on the support making a part of metallocene compound separate from the support dissolve in the polymerization medium, and form a homogeneous catalyst, thereby leading to a poor particle morphology of the polymer.

Therefore, if the process proceeds inversely, i.e. MAO is first combined with magnesium halide support and then the m tallocene compound is supported on the magnesium halide support, not only the above shortcoming of the dissolving and separating of the metallocene compound from the support due to the addition of a great amount of MAO can be overcome, but also only a small amount of MAO is needed to fully activate the metallocene compound on the support, thereby reducing the cost of the catalyst and enhancing its activity. But because there exists hydroxyl on the surface of the support such as silica, etc, MAO many connect with the support with chemical bonds through reaction with hydroxyl, and therefore it hard to separate from the support when polymerization is carried out. As for a metallocene catalyst with magnesium halide as the support because there is no hydroxyl on the surface of the support, it cannot connect with MAO by chemical bonds as silica, and therefore the supporting of MAO on magnesium halide is not firm. Therefore, from the teaching of the prior art, the method that MAO is first supported, and then metallocene is supported is not suitable for magnesium halide. Therefore, nobody makes such an attempt in the prior art, in other words, the prior art has not disclosed the combination of magnesium halide with MAO to form corresponding catalyst component.

However, the inventors of the present invention have unexpectedly discovered that sufficient aluminoxane can be firmly supported on magnesium halide by adding a multifunctional organic compound.

SUMMARY OF THE INVENTION

The present invention therefore provides a catalyst component for olefin (co)polymerization, which comprises a magnesium compound supporting aluminoxane and contains more than 5% by weight of aluminum. Said magnesium compound is selected from magnesium dihalide and a derivative formed by substitution of a halogen atom in the formula of magnesium dihalide with hydrocarbyl or halogen alkoxide.

The present invention also provides a catalyst component for olefin (co)polymerization, which is prepared by contacting aluminoxane with a magnesium compound in the presence of a multifunctional organic compound. Said magnesium compound is selected from magnesium dihalide, associated compound of magnesium dihalide with water or alcohol, and the derivative formed by substitution of a halogen atom in the formula with hydrocarbyl or halogen alkoxide.

The present invention also provides a catalyst component for olefin (co)polymerization, which comprises a metallocene compound, aforesaid catalyst component and an alkyl aluminum compound. When said catalyst is used for olefin polymerization, the catalytic activity is high, a spherical polymer can be obtained, the particle morphology of the obtained polymer is good, and the particle distribution is narrow.

The present invention also provides the use of the aforesaid catalyst for olefin (co) polymerization.

DETAILED DESCRIPTION OF THE INVENTION

The present invention provides a catalyst component suitable for olefin (co)polymerization, which comprises a magnesium compound supporting aluminoxane and contains more than 5% by weight of aluminum, preferably 8–12%. Said magnesium compound is selected from magnesium dihalide and the derivative formed by substitution of a halogen atom in the formula of magnesium dihalide with hydrocarbyl or halogen alkoxide.

The present invention also provides a catalyst component for olefin (co)polymerization, which is prepared by contacting aluminoxane with a magnesium compound in the presence of a multifunctional organic compound. Said magnesium compound is selected from magnesium dihalide, associated compound of magnesium dihalide with water or alcohol, and the derivative formed by substitution of a halogen atom in the formula with hydrocarbyl or halogen alkoxide.

Said catalyst component is typically prepared by a process comprising the following steps:

(1) Mixing a magnesium halide and aluminoxane in a solvent of aliphatic or aromatic hydrocarbon and carrying out reaction at 50–100° C. for a certain period, yielding a suspension, wherein the ratio of the magnesium halide to aluminoxane is Mg:Al=1:10–10.1, preferably Mg:Al=1:2–1:0.5, most preferably Mg:Al=1:1.

(2) Adding a multifunctional organic compound to the suspension obtained in step (1) and carrying out reaction at 50–100° C. for a certain period, the molar ratio of Al in said aluminoxane to the functional group in the multifunctional organic compound being 10-1, preferably 7-2.

The multifunctional organic compound suitable for the present invention is an organic compound containing ax least two reacting groups, wherein said functional group is hydroxyl, aldehyde group, carboxyl, primary or secondary amido, or epoxy group. The multifunctional organic compound may be $C_2$–$C_{12}$ aliphatic or aromatic diol, or triol thereof; $C_2$–$C_{12}$ aliphatic or aromatic dialdehyde; $C_2$–$C_{12}$ aliphatic or aromatic dicarboxylic acid; $C_2$–$C_{12}$ aliphatic or aromatic primary diamine, or secondary diamine thereof, or bisepoxides. The specific compound may be the compound selected from the group consisting of ethylene glycol, glycerine, butene glycol, hexene glycol, decene glycol, bisphenol A, oxalic acid, triethanolamine, and 1,4-butanediol diglycidyl ether.

The magnesium compound used in the present invention is selected from the group consisting of magnesium dihalide, complex of magnesium dihalide with water or alcohol, and a derivative formed by substitution of a halogen atom in the formula with hydrocarbyl or halogen alkoxide, wherein the magnesium dihalide is magnesium dichloride, magnesium dibromide or magnesium diiodide. The complex of magnesium dihalide with water or alcohol is typically selected from alcoholate of magnesium dichloride of spherical particle with diameter of 10–300 μm. The preparation method thereof may refer to the method disclosed in CN1130914, which is typically mixing a $C_1$–$C_4$ low alcohol with magnesium chloride in a molar ratio of 2.0:1–3.6:1. The preparation process may proceed in an inert solvent medium by quenching the molten resultant formed by heating, the melting temperature being preferably 100–135° C., thus yielding a spherical particle of the alcoholate of magnesium chloride with an alcohol/magnesium chloride molar ratio of 2.0–3.6. The alcoholate may be used directly, or after removing a part or all of the alcohol by physical or chemical method. The physical method is heat-treating the alcoholate in nitrogen to remove a part of alcohol yielding a spherical particle containing less alcohol. The extent of alcohol removal is that the remaining alcohol is below $MgCl_2$: EtOH=1:1 (molar ratio), preferably below 1:0.5, and most preferably below 1:0.02 or completely removed. The chemical method is reacting alcohol with alkyl aluminum (such as trimethyl aluminum, triethyl aluminum, or tri-isobutyl aluminum) to remove alcohol.

Wherein said $C_1$–$C_4$ low alcohol includes methanol, ethanol, n-propanol, iso-propanol, n-butanol, or iso-butanol.

Although the multifunctional organic compound (such as ethylene glycol) does not dissolve in the reaction medium (such as toluene), in the process of supporting aluminoxane on the spherical magnesium chloride, the addition of the multifunctional organic compound can double the supported aluminoxane. The amount of the multifunctional organic compound is Al/OH(NH)=10-1 (Al is based on Al in aluminoxane and OH(NH) is based on OH or NH group in the multifunctional organic compound, both by mole).

The general formula of the aluminoxane said in the present invention is:

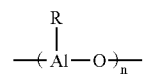

Wherein R is a $C_1$–$C_{12}$ alkyl, such as methyl, ethyl, propyl, butyl, pentyl, hexyl, octyl, preferably methyl; n is 1–20, preferably 15–20. The aluminoxane compound is mainly obtained by hydrolysis of alkyl aluminum, such as the method of using a metal inorganic salt as a water source to hydrolyze alkyl aluminum disclosed by U.S. Pat. No. 4,544,762, the method of using deionized water as a water source to hydrolyze alkyl aluminum disclosed by U.S. Pat. No. 4,968,827; the method of using cyclodextrin as a water source to hydrolyze alkyl aluminum disclosed by CN 94119050.1.

The aforesaid catalyst component of the present invention is typically a spherical particle, wherein the percentage of Al is greater 5% by weight, preferably 8–12%. The specific surface area of the catalyst component is 50–200 m²/g and the pore volume is 0.02–0.5 cm³/g measured by BET method.

The present invention also provides a metallocene catalyst supported on a magnesium compound support, comprising the following components:

(1) aforesaid spherical catalyst component;

(2) a metallocene compound represented by the following general formula:

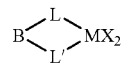

wherein M is a transition metal Ti or Zr or Hf;

X is an alkyl or halogen,

L or L' is a ligand selected from cyclopentadienyl, substituted cyclopentadienyl, indenyl, substituted indenyl, fluoryl; and L and L' may be the same, or different, B is a bridge linking the two ligands, L and L', and this bridge may optionally exist depending on the difference of L and L'. The form of the bridge is one of —SiR R—, —GeR R'—, —CR R'—, —SiR—O—Si R', wherein R and R' are $C_1$–$C_{20}$ straight chain alkyls, and they may be the same, or different.

(3) At least one alkyl aluminum compound having the general formula of $AlR_nX_{3-n}$, wherein R is a $C_1$–$C_{20}$ hydrocarbyl and X is halogen;

The molar ratio of Al in said component (1) to transition metal in component (2) is 20–2000, preferably 40–60. The molar ratio of Al in said component (3) to Al in component (1) is 1–50, preferably 3–28, and more preferably 5–7.

In principle, any metallocene or a mixture thereof can react with the aforesaid catalyst component of the present invention to prepare the catalyst of the present invention, and the following compounds are preferred: $Cp_2ZrCl_2$, $Me_2SiCp_2ZrCl_2$, $Cp_2TiCl_2$, $Cp_2HfCl_2$, $Cp_2TiMeCl$, $Cp_2ZrMe_2$, $Cp_2TiMe_2$, $(C_5Me_5)_2ZrCl_2$, $(MeC_5H_4)_2ZrCl_2$, $(EtC_5H_4)_2ZrCl_2$, $(n-C_3H_7C_5H_4)_2ZrCl_2$, $(i-C_3H_7C_5H_4)_2ZrCl_2$, $(n-BuC_5H_4)_2ZrCl_2$, $(i-BuC_5H_4)_2ZrCl_2$, $(t-BuC_5H_4)_2ZrCl_2$, (1,2-dimehyl $C_5H_3)_2ZrCl_2$, (1,3-dimethyl $C_5H_3)_2ZrCl_2$, (1,2,3trimethyl $C_5H_2)_2ZrCl_2$, (1,3,4-trimethyl $C_5H_2)_2ZrCl_2$, (1,2-diethyl $C_5H_3)_2ZrCl_2$, (1,3-diethyl $C_5H_3)_2ZrCl_2$, $(NmCp)_2ZrCl_2$, $[O(SiMe_2Cp)_2]ZrCl_2$, $[O(SiMe_2t-BuCp)_2]ZrCl_2$, $[Et(Ind)_2]ZrCl_2$, $[Et(2,4,7-Me_3Ind)_2]ZrCl_2$, $[Et(IndH_4)_2]ZrCl_2$, $[Me_2Si(Cp)(Me_4Cp)]ZrCl_2$, $(Cp)(Me_4Cp)]ZrCl_2$, $[Me_2Si(Ind)_2]ZrCl_2$, $[Ph_2Si(Ind)_2]ZrCl_2$, $[Bz_2Si(Ind)_2]ZrCl_2$, $[Me_2Si(2,4,7-Me_2Ind)_2]ZrCl_2$, $[Me_2Si(IndH_4)_2]ZrCl_2$, $[Me_2Si(2-Me-4,6-i-Pr_2Ind)_2]ZrCl_2$, $[Me_2Si(2-Me-4-Ph-Ind)_2]ZrCl_2$, $[Me_2Si(2-Me-4,6-BEt_2Ind)_2]ZrCl_2$, $[Ph_2C(Ind)(Cp)]ZrCl_2$, $[Me_2C(Ind)(Cp)]ZrCl_2$, $[Me_2C(Ind)(3-MeCp)]ZrCl_2$, $[Ph_2C(Flu)(Cp)]ZrCl_2$, $[Me_2C(Flu)(Cp)]ZrCl_2$, $[Me_2Ge(2-Me-4-Ph-Ind)_2]ZrCl_2$, $(MeC_5H_4)_2HfCl_2$, $(EtC_5H_4)_2HfCl_2$, $(n-C_3H_7C_5H_4)_2 HfCl_2$, $(i-C_3H_7C_5H_4)_2HfCl_2$, $(n-BuC_5H_4)_2HfCl_2$, $(i-BuC_5H_4)_2HfCl_2$, $(t-BuC_5H_4)_2HfCl_2$, $[Et(Ind)_2]HfCl_2$, $[Me_2C(Flu)(Cp)]HfCl_2$, and $[Me_2Si(Cp)(Me_4Cp)]HfCl_2$.

In said alkyl aluminum compound having the general formula of $AlR_nX_{3-n}$ R is hydrogen, $C_1$–$C_{20}$ hydrocarbyl, especially alkyl, aralkyl, and aryl; X is a halogen, especially chlorine and bromine; n is a number and $0 < n \leq 3$. The specific compound is: trimethyl aluminum, triethyl aluminum, tri-isobutyl aluminum, trioctyl aluminum, monohydro diethyl aluminum, monohydro di-isobutyl aluminum, monochloro diethyl aluminum, monochloro di-isobutyl aluminum, sesquiethyl aluminum chloride, dichloro ethyl aluminum, wherein triethyl aluminum and tri-isobutyl aluminum are preferred.

The three catalyst components said in the catalyst of the present invention may react by using one of the following ways, (1) continuously supporting the main catalyst the metallocene compound, on catalyst component (1) before the polymerization reaction, e.g., contacting the catalyst component whereon aluminoxane has already been supported with the solution of a metallocene compound and carrying out reaction at a temperature between room temperature and 90° C., removing the metallocene compound unfixed on the support by washing, and contacting the obtained solid component with catalyst component (3) in the polymerization reaction system.

(2) contacting said three catalyst components and carrying out reaction before polymerization reaction, and using the obtained product in olefin polymerization.

(3) said three catalyst components are simultaneously added in the polymerization reaction.

The catalyst system of the present invention can be used in olefin (co)polymerization. Said olefin may be ethylene, propylene, butene, and the copolymerized monomer for copolymerization may be selected from 1-butene, 1-hexene, 1-octene; the polymerization process may be a slurry process, a solution process, or a gas phase process.

The following example will describe the present invention in detail.

EXAMPLE 1

Preparation of Catalyst Component (1)

(1) Preparation of Magnesium Chloride Alcoholate

Into a white oil medium was added 47.6 g anhydrous magnesium chloride and 59.8 g ethanol (the molar ratio of ethanol to magnesium chloride was 2.6/1). The amount of white oil was 286 ml, and its viscosity was 30 cP (20° C.). The reaction was carried out at 125° C. for 2 hours. The mixed solution of molten alcoholate with white oil obtained in the aforesaid reaction was transferred to a methyl silicone oil medium preheated to 125° C., The viscosity of the methyl silicone oil was 300 cP (20° C.), and the a mount of the methyl silicone oil was 572 ml. The resultant was stirred at a rotation rate of 2400 rpm for 12 min. The mixed solution dispersed by the high speed stirring was Transferred into a hexane medium precooled to −30° C. with a pipe having a height/diameter ratio of 45 in a flow rate of 300 ml/min and stirred in a rotation ratio of 300 rpm for 15 min. The ratio of the hexane to the mixed solution was 4:1 by volume. Solid particles were filtered out from the obtained suspension after quenching. The particles were washed with hexane amounting 5–10 ml/g particle at room temperature five times and dried at 30–50° C. by evacuation, yielding 105 g spherical support, wherein the molar ratio of alcohol to magnesium chloride determined by TGA was 2.6. The alcoholate was heated at 90–200° C. in a nitrogen stream to remove alcohol until $MgCl_2$:EtOH=70:1 (molar ratio). The characters of the alcoholate were measured by BET to be: specific surface area 56.9 m²/g, and pore volume 0.39 cm³/g.

(2) Supporting MAO on Magnesium Chloride Alcoholate

At 20° C. and in nitrogen atmosphere, 30 ml toluene and 3 g aforesaid magnesium chloride alcoholate were added to a 500 ml three-necked bottle equipped with an anchor stirrer, 15 ml MAO solution in toluene (10% by weight) was added while stirring, and the mixture was heated to 70° C. and kept at this temperature for 1 hour. Then 0.14 ml dry glycerine [Al (MAO)/OH (glycerine)=5, molar ratio] and the reaction was carried out at 70° C. for 4 hours. Stirring was stopped, and the supernatant was decanted after the suspended matter was settled. The sediment was washed with hexane at 50° C. for three times and evacuated at 50° C. to evaporate the solvent, yielding about 3.2 g spherical catalyst component, wherein the content of Al was 9.09% by weight. The characters of the catalyst component were measured by BET to be: specific surface area 94.69 m$^2$/g, and pore volume 0.24 cm$^3$/g.

Polymerization Reaction of Ethylene

A suspension was obtained by precontacting 90 mg of the aforesaid catalyst component and 2 ml solution of Et(Ind)$_2$ZrCl$_2$ in toluene with a concentration of 0.3 mg Zr/ml under the protection of nitrogen for 5 min.

1000 ml hexane, 1 ml solution of tri-isobutyl aluminum in hexane with a concentration of 2 mol/l, and the aforesaid suspension were added to a 2 liter steel autoclave fully replaced with nitrogen. The autoclave was heated to 70° C., and then 1.5 MPa of ethylene was introduced to carry out the polymerization reaction at 80° C. and a constant pressure of ethylene for 1 hour. The reaction was stopped and 380 g polyethylene was obtained (polymerization activity; 4222 g PE/g cat·h, 5.78×10$^7$ g PE/mol Zr·h); apparent density=0.40 g/cm$^3$. The distribution of the molecular weight was determined using a gel permeation chromatograph (PL-GPC 220) at 150° C. with 1,2,4-trichlorobenzene as a solvent and a standard polystyrene sample as a calibration agent. The determined Mw/Mn of the polymer was 4.3.

EXAMPLE 2

Preparation of Catalyst Component (1)
The same as Example 1

Polymerization Reaction of Ethylene

The same as Example 1 except that 1 ml solution of tri-isobutyl aluminum in hexane with a concentration of 2 mol/l was replaced by 1 ml solution of triethyl aluminum in hexane, yielding 176 g polyethylene (polymerization activity; 1956 g PE/g cat·h, 2.68×10$^7$ g PE/mol Zr·h), the apparent density of which was 0.37 g/cm$^3$ and Mw/Mn was 3.6.

EXAMPLE 3

Preparation of Catalyst Component (1)
The same as Example 1

Polymerization Reaction of Ethylene

The same as Example 1 except that the solution of Et(Ind)$_2$ZrCl$_2$ in toluene with a concentration of 0.3 mg Zr/ml was replaced by the solution of (n-BuCp)$_2$ZrCl$_2$ in toluene with a concentration of 0.3 mg Zr/ml before polymerization, yielding 446 g polyethylene (polymerization activity: 5310 g PE/g cat·h, 6.78×10$^7$ PE/mol Zr·h), the apparent density of which was 0.37 g/cm$^3$ and Mw/Mn was 4.3. The particle distribution of the polymer is shown in Table 2.

EXAMPLE 4

Preparation of Catalyst Component (1)
The same as Example 1

Polymerization Reaction of Ethylene

The same as Example 1 except that the solution of Et(Ind)$_2$ZrCl$_2$ in toluene with a concentration of 0.3 mg Zr/ml was replaced by the solution of Cp 1ZrCl$_2$ in toluene with a concentration of 0.3 mg Zr/ml, yielding 103 g polyethylene (polymerization activity; 1144 g PE/g cat·h, 1.57×10$^7$ g PE/mol Zr·h), the apparent density of which was 0.33 g/cm$^3$ and Mw/Mn was 3.4.

EXAMPLE 5

Preparation of Catalyst Component (1)
The same as Example 1

Copolymerization Reaction of Ethylene With Hexene

The same as Example 2 except that in the polymerization process, 12 ml dry 1-hexene was also added and the polymerization temperature was changed to 80° C., yielding 108 g polyethylene (polymerization activity: 1213 g PE/g cat·h, 1.64×10$^7$ g PE/mol Zr·h), the apparent density of which was 0.36 g/cm$^3$.

EXAMPLE 6

Preparation of Catalyst Component (1)
The same as Example 1

Polymerization Reaction of Propylene

A suspension was obtained by precontacting 472 mg MAO-supported catalyst component and 4 ml solution of Et(Ind)$_2$ZrCl$_2$ in toluene with a concentration of 0.3 mg Zr/ml under the protection of nitrogen for 5 min.

1 ml solution of tri-ethyl aluminum in hexane with a concentration of 2 mol/l, 1000 ml hexane, and the afor said suspension were added to a 2 liter stainless steel autoclave under the protection of nitrogen. The autoclave was heated to 70° C., and then 0.7 MPa propylene was introduced to carry out the polymerization reaction at 50° C. and a constant pressure of propylene for 1 hour. The polymerization reaction was stopped and 146 g polypropylene was obtained (polymerization activity: 309 g PP/g cat·h, 1.1×10$^7$ g PP/mol Zr·h).

EXAMPLE 7

Preparation of Catalyst Component (1)
The same as Example 1

Polymerization Reaction of Propylene

The same as Example 6 except that the amount of the MAO-supported catalyst component changed to 209 mg, and the amount of the solution of Et(Ind)$_2$ZrCl$_2$ in toluene with a concentration of 0.3 mg Zr/ml changed to 2 ml, yielding 17 g polypropylene (polymerization activity: 81 g PP/g cat·h, 2.6×10$^6$ PP/mol Zr·h).

EXAMPLE 8

Preparation of Catalyst Component (1)
The same as Example 1 except that the multifunctional organic compound was changed from glycerine to 0.3 ml ethylene glycol (Al/OH)=2.5:1), yielding about 3.4 g spherical catalyst component, wherein the content of Al was 12.32% by weight. The characters of the catalyst component were measured by BET to be: specific surface area 159.6 m$^2$/g, and pore volume 0.25 cm$^3$/g.

Polymerization Reaction

The same as Example 2, yielding 178 g polyethylene with the following characters (polymerization activity: 1978 g PE/g cat·h, $2.71 \times 10^7$ PE/mol Zr·h). The apparent density was 0.37 cm³.

EXAMPLE 9

Preparation of Catalyst Component (1)

The same as Example 1 except that the multifunctional organic compound was changed from glycerine to 0.15 ml ethylene glycol (Al/OH)=5:1), yielding about 3.25 g spherical catalyst component, wherein the content of Al was 8.58% by weight.

Polymerization Reaction

The same as Example 2, yielding 92 g polyethylene (polymerization activity: 1022 g PE/g cat·h. $1.40 \times 10^7$ g PE/mol Zr·h). The apparent density of the polymer was 0.33 g/cm³, and the particle distribution is shown in Table 2.

EXAMPLE 10

Preparation of Catalyst Component (1)

The same as Example 1 except that the magnesium chloride alcoholate was dealcoholized until $MgCl_2$:EtOH=450:1 (molar ratio), yielding about 3.35 g spherical catalyst component, wherein the content of Al was 11.55% by weight.

Polymerization Reaction

The same as Example 2, yielding 136 g polyethylene (polymerization activity: 1494 g PE/g cat·h, $2.07 \times 10^7$ g PE/mol Zr·h; the apparent density of the polymer was 0.37 g/cm³).

EXAMPLE 11

Preparation of Catalyst Component (1)

The same as Example 1 except that the magnesium chloride alcoholate was dealcoholized until $MgCl_2$:EtOH=30:1 (molar ratio), yielding about 3.35 g spherical catalyst component, wherein the content of Al was 10.41% by weight.

Polymerization Reaction

The same as Example 2, yielding 85 g polyethylene (polymerization activity 944 g PE/g cat·h, $1.29 \times 10^7$ g PE/mol Zr·h; the apparent density of the polymer was 0.37 g/cm³).

EXAMPLE 12

Operation of Catalyst Component (1)

The same as Example 1 except that the multifunctional organic compound was changed to 0.24 ml triethanolamine (Al/OH)=5), yielding about 3.3 g spherical catalyst component, wherein the content of Al was 10.42% by weight. The character of the catalyst component was measured by BET to be: specific surface area: 146.18 m²/g.

Polymerization Reaction

The same as Example 2, yielding 135 g polyethylene with the following characters (polymerization activity: 1500 g PE/g cat·h $0.05 \times 10^7$ g PR/mol Zr·h; apparent density: 0.37 g/cm³).

EXAMPLE 13

Preparation of Catalyst Component (1)

The same as Example 1

Reaction of Catalyst (1) With Catalyst (2)

At 20° C. and in nitrogen atmosphere, 30 ml toluene and catalyst component (1) were added to a 500 ml three-necked bottle equipped with an anchor stirrer, which bottle had been dried aid purged overnight with nitrogen. Then 63 mg $(n-BuCp)_2ZrCl_2$ dissolved in toluene was added and the r action was carried out at 50° C. for 1 hour. Stirring was stopped, and the supernatant was decanted after the suspended matter settled. The sediment was washed with hexane at 50° C. for three times and evacuated at 50° C. to evaporate the solvent yielding a yellowish catalyst powder.

Polymerization Reaction (Slurry Polymerization)

Under the protection of nitrogen, 1 ml solution of triethyl aluminum in hexane with a concentration of 2 mol/l, was added to a 2 liter steel autoclave having been treated with nitrogen at 90° C. for 2 h, and subsequently 91 mg aforesaid catalyst component was rinsed with 1000 ml hexane into the autoclave. The autoclave was heated to 70° C., and then 1.5 MPa ethylene was introduced to carry out the polymerization reaction at 80° C. and a constant pressure of ethylene for 1 hour. The polymerization reaction was stopped by cooling the autoclave to 40° C. and then instantly venting the gas. The slurry of the polymer was discharged, yielding 280 g polyethylene (polymerization activity: 3077 g PE/g cat·h the apparent density was 0.37 g/cm³).

Polymerization Reaction (Gas Phase Polymerization)

100 ml solution of triethyl aluminum in hexane with a concentration of 2 mol/l and 600 g polyethylene as a base resin were added to a Φ=150 mm gas phase fluidized bed polymerization reactor. 209 g aforesaid catalyst was blown into the reactor with high pressure $N_2$ and 0.35 kg 1-butene was introduced. After reaction under conditions of a fluidizing velocity of 0.2–0.3 m/s, an ethylene pressure of 1.7 MPa, and a temperature of 90° C. for 4 hours, the temperature was lowered, pressure relieved, and material discharged, yielding 2600 g spherical polyethylene particles deducting the base resin, the characters of which: polymerization activity 12440 g PE/g cat·h, MI=0.38, density 0.9243 g/cm³, particle distribution: 20–40 mesh: 47.3%, 40–60 mesh: 45.2%, 60–120 mesh 4.9%; >120 mesh: 2.6%.

EXAMPLE 14

Preparation of Catalyst Component (1)

The same as Example 1 except that the dealcoholized spherical particle was added to the solution of triethyl aluminum in hexane with an amount of Mg:Al=1:1 (molar ratio) and the reaction was carried out at 50° C. for 1 hour, yielding about 3.2 g spherical catalyst component, wherein the content of Al was 9.09% by weight.

Polymerization Reaction

The same as Example 2, yielding 155 g polyethylene (polymerization activity: 1722 g PE/g cat·h, $2.68 \times 10^7$ g PE/mol Zr·h); apparent density=0.37 g/cm³.

COMPARATIVE EXAMPLE 1

Preparation of Catalyst Component (1)

The same Example 1 except that no glycerine was added. The obtained catalyst component (1) has the following characters: Al%=3.79%; specific surface area; 78.51 m$^2$/g, pore volume: 0.45 cm$^3$/g by BET.

Polymerization Reaction

The same as Example 2 except that the amount of MAO-supported catalyst component (1) was 264 mg, yielding 56 g polyethylene with the following characters (polymerization activity 212 g PE/g cat·h, 8.5×10$^5$ g PE/mol Zr·h, apparent density=0.37 g/cm$^3$). The polymerization tended to agglomerate and cannot be screened.

COMPARATIVE EXAMPLE 2

Preparation of Catalyst Component (1)

At 400° C. and under the protection of nitrogen, 955 type of macroporous microspherical silica gel of Grace Corp., USA (specific surface area 251.8 m$^2$/g, pore volume 1.64 cm$^3$/g) was heated for 4 hours, yielding a support after cooling with the following characters: specific surface area 240.4 m$^2$/g pore volume 1.03 cm$^3$/g.

At 20° C. and in nitrogen atmosphere, 100 ml toluene and 4 g support prepared above were added to a 500 ml three-necked bottle equipped with an anchor stirrer. 20 ml of 10% by weight MAO solution in toluene was added in 30 min while stirring, and the mixture was heated to 50° C. simultaneously and kept at this temperature for 4 hour. Stirring was then stopped and the supernatant was decanted after the suspended matter settled. The sediment was washed at 50° C. with toluene for three times and evacuated at 50° C. to evaporate the solvent, yielding about 4.8 g catalyst component, wherein the content of Al was 12.44% by weight. The characters of the catalyst component were measured by BET to be: specific surface area 212.3 m$^2$/g, and pore volume 0.52 cm$^3$/g.

Polymerization Reaction

The same as Example 2, yielding 163 g polyethylene with the following characters (polymerization activity: 1811 g PE/g cat·h, 2.48×10$^7$ g PE/mol Zr·h, apparent density=0.37 g/cm$^3$). The particle distribution is shown in Table 2.

Compared to the prior art, the catalyst system of the present invention possesses the following advantages and effectiveness:

The catalyst system of the present invention shows higher polymerization activity when used in the polymerization of olefins. Besides, the particle morphology of the obtained polymer is very good, the particle distribution is narrower, and a spherical polymer can be obtained.

Because of the use of a multifunctional organic compound in MAO-supported catalyst component (1) according to the present invention, the amount of MAO supported on the magnesium compound is greatly increased, thereby the activity of the obtained catalyst is markedly enhanced. This can be seen from the comparison among Example 3, Example 9, and Comparative Example 1 in Table 2.

Compared to Comparative Example 2, the particle of the polymer prepared by using the catalyst of the present invention obviously duplicates the shape of the spherical MgCl$_2$. Compared to the catalyst using silica gel as the support the cost of the catalyst of the present invention is lower, the particle morphology of the polymer is better, and the particle is bigger, and the particle distribution is narrower.

Because the ratio of transition metal in the metallocene compound to aluminum in aluminoxane in the catalyst system of the present invention is lower, the amount of the aluminoxane is greatly reduced, thereby the cost is lowered.

|  | Catalyst component (1) |  | Metallocene | Alkyl | Polymerization activity | Apparent |  |
| --- | --- | --- | --- | --- | --- | --- | --- |
| Example | MgCl$_2$/EtOH | Al/OH | compound | aluminum | (g polymer/g cat · h) | desity | Al/Zr |
| 1 | 70:1 | MAO/Glycerine (5:1) | Et(Ind)$_2$ZrCl$_2$ | Tri-isobutyl aluminum | 4222 | 0.40 | 46 |
| 2 | 70:1 | MAO/Glycerine (5:1) | Et(Ind)$_2$ZrCl$_2$ | Triethyl aluminum | 1956 | 0.37 | " |
| 3 | 70:1 | MAO/Glycerine (5:1) | (n-BuCp)$_2$ZrCl$_2$ | Tri-isobutyl aluminum | 5310 | 0.37 | " |
| 4 | 70:1 | MAO/Glycerine (5:1) | Cp$_2$ZrCl$_2$ | Tri-isobutyl aluminum | 1144 | 0.33 | " |
| 5 | 70:1 | MAO/Glycerine (5:1) | Et(Ind)$_2$ZrCl$_2$ | Triethyl aluminum | 1213[×] | 0.36 | " |
| 6 | 70:1 | MAO/Glycerine (5:1) | Et(Ind)$_2$ZrCl$_2$ | Triethyl aluminum | 309[×] pp | / | 122 |
| 7 | 70:1 | MAO/Glycerine (5:1) | Et(Ind)$_2$ZrCl$_2$ | Tri-isobutyl aluminum | 81[×] PP | / | 108 |
| 8 | 70:1 | MAO/Ethanediol (2.5:1) | Et(Ind)$_2$ZrCl$_2$ | Triethyl aluminum | 1978 | 0.37 | 63 |
| 9 | 70:1 | MAO/Ethanediol (5:1) | Et(Ind)$_2$ZrCl$_2$ | Triethyl aluminum | 1022 | 0.33 | 44 |
| 10 | 450:1 | MAO/Glycerine (5:1) | Et(Ind)$_2$ZrCl$_2$ | Triethyl aluminum | 1494 |  | 59 |
| 11 | 30:1 | MAO/Glycerine (5:1) | Et(Ind)$_2$ZrCl$_2$ | Triethyl aluminum | 944 | 0.37 | 53 |
| 12 | 70:1 | MAO/Triethanolamine (5:1) | Et(Ind)$_2$ZrCl$_2$ | Triethyl aluminum | 1500 | 0.37 | 53 |

[×]Example 5 was copolymerization of ethylene with hexane, Examples 6 and 7 were polymerization of propylene, and all the others were polymerization of propylene

TABLE 2 comparison of the particle distribution in the polymers

| No. | Support | Polymerization activity g PE/g cat · h | Particle distribution (%) | | | | |
|---|---|---|---|---|---|---|---|
| | | | <20 mesh | 20–40 mesh | 40–60 mesh | 60–120 mesh | >120 mesh |
| Example 3 | MgCl$_2$/glycerine | 5310 | 10.1 | 80.6 | 6.8 | 2.5 | 0.06 |
| Example 9 | MgCl$_2$/Ethanediol | 1022 | 8.2 | 65.3 | 20.4 | 5.8 | 0.3 |
| Comparative Example 1 | MgCl$_2$ | 212 | / | / | / | / | / |
| Comparative Example 1 | SiO$_2$ | 1811 | 0.9 | 34.5 | 28.4 | 30.2 | 6.0 |

The invention claimed is:

1. A catalyst component for olefin (co)polymerization, which is prepared by contacting aluminoxane with a magnesium compound in the presence of a multifunctional organic compound; said magnesium compound is selected from magnesium dihalide, associated compound of magnesium dihalide with water or alcohol, or the derivative formed by substitution of a halogen atom in the formula with hydrocarbyl or halogen alkoxide, the content of aluminum is greater than 5% by weight; and wherein the multifunctional organic compound may be one or more selected from C$_2$–C$_{12}$ aliphatic or aromatic diol, or triol thereof; C$_2$–C$_{12}$ aliphatic or aromatic dialdehyde; C$_2$–C$_{12}$ aliphatic or aromatic dicarboxylic acid; C$_2$–C$_{12}$ aliphatic or aromatic primary, or secondary diamine thereof, or bisepoxides.

2. The catalyst component according to claim 1, wherein the content of aluminum is 8–12% by weight.

3. The catalyst component according to claim 1, the preparation process of further comprising the following steps:

(1) Mixing a magnesium compound and aluminoxane in a solvent of aliphatic or aromatic hydrocarbon and carrying out reaction at 50–100° C. for a certain period, wherein the molar ratio of the magnesium compound to aluminoxane is in the range of about 1:10–1:0.1;

(2) Adding the multifunctional organic compound to the suspension obtained in step (1) and carrying out reaction at 50–100° for a certain period, yielding a suspension, wherein the molar ratio of Al in aluminoxane to the functional group in the multifunctional organic compound is in the range of about 10:1.

4. The catalyst component according to claim 1 or 2, wherein the molar ratio of the magnesium compound to aluminoxane is in the range of about 1:2–1:0.5.

5. The catalyst component according to claim 1 or 2, wherein the molar ratio of Al in aluminoxane to the functional group in the multifunctional organic compound is in the range of about 7:2.

6. The catalyst component according to claim 1 or 2, wherein the multifunctional organic compound is an organic compound containing at least two functional groups, and said functional group is one selected from hydroxyl, aldehyde group, carboxyl, primary or secondary amido, or epoxy group.

7. The catalyst component according to claim 6, wherein the multifunctional organic compound is seleded from ethylene glycol, glycerine, butene glycol, hexene glycol, decene glycol, bisphenol A, oxalic acid, triethanolamine, or 1,4-butanediol diglycidyl ether.

8. The catalyst component according to claim 1 or 2, wherein the magnesium compound is an associated compound of magnesium dihalide with alcohol.

9. The catalyst component according to claim 8, wherein the associated compound of the magnesium compound with alcohol is prepared by mixing a C1–C4 low alcohol with magnesium dihalide in a molar ratio in the range of about 2.0:1–3, 6:1, heating to melt the mixture, and then quenching the molten resultant, thus fielding a spherical particle with a molar ratio of alcohol to magnesium chloride in the range of about 2.0:3.6.

10. The catalyst component according to claim 9, wherein the spherical particle with a molar ratio of alcohol to magnesium chloride in the range of about 2.0:3.6 is further dealcoholized to yield a spherical particle with a molar ratio of alcohol to magnesium chloride lower than 1.0.

11. The catalyst component according to claim 1, wherein the general formula of the aluminoxane is (R—Al—O)$_{ns}$ wherein R is a C$_1$ C$_{12}$ alkyl and n ranges from about 1–20.

12. A catalyst for olefin (co)polymerization, which comprises the following components:

(1) A catalyst component according to claim 1;
(2) A metallocene compound represented by the following general formula:

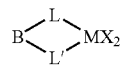

wherein M is a transition metal Ti or Zr or Hf;

X is an alkyl or halogen;

L or L' is a ligand selected from the group consisting of cyclopentadienyl, substituted cyclopentadienyl, indenyl, substituted indenyl, fluoryl, and substituted fluoryl; L and L' may be the same, or different;

B is a bridge linking the two ligands, L and L'; and this bridge may optionally exist depending on the difference of L and L'; the form of the bridge is one selected from the group consisting of —SIR R$^3$—, —GeR R$^3$—, —CR R$^3$—, —SiR—O—Si—R$^3$, wherein R or R$^3$ are C$_1$–C$_{20}$ straight chain alkyls; and they may be the same, or different;

(3) At least one alkyl aluminum compound having the general formula of AlR$_n$X$_{ns}$ wherein R is C$_1$–C$_{20}$ hydrocarbyl and X is halogen.

13. The catalyst according to claim 12, wherein the metallocene compound is one or more selected from the group consisting of: Cp$_2$ZrCl$_2$, Me$_2$SiCp$_2$ZrCl$_2$, Cp$_2$TiCl$_2$, Cp$_2$HfCl$_2$, Cp$_2$TiMeCl, Cp$_2$ZrMe$_2$, Cp$_2$TiMe$_2$, (C$_5$Me$_5$)$_2$ZrCl$_2$, (MeC$_5$H$_4$)$_2$ZrCl$_2$, (EtC$_5$H$_4$)$_2$ZrCl$_2$, (n-C$_3$H$_7$C$_5$H$_4$)$_2$ZrCl$_2$, (i-C$_3$H$_7$C$_5$H$_4$)$_2$ZrCl$_2$, (i-C$_3$H$_7$C$_5$H$_4$)$_2$ZrCl$_2$, (n-BuC$_5$H$_4$)$_2$ZrCl$_2$, (i-BuC$_5$H$_4$)$_2$ZrCl$_2$, (t-BuC$_5$H$_4$)$_2$ZrCl$_2$, (1,2-dimehyl C$_2$H$_3$)$_2$ZrCl$_2$, (1,3-dimethylC$_2$H$_3$)$_2$ZrCl$_2$, (1,2,3-trimethyl C$_5$H$_2$)$_2$ZrCl$_2$, (1,3,4-trimethyl C$_5$H$_2$)$_2$ZrCl$_2$, (1,2-diethylC$_5$H$_3$)$_2$ZrCl$_2$, (1,3-diethyl C$_5$H$_3$)$_2$ZrCl$_2$, (1,3-diethyl C$_5$H$_3$)$_2$ZrCl$_2$, (NmCp)$_2$ZrCl$_2$, [O(SiMo$_2$Cp)$_2$]ZrCl$_2$, [O(SiMe$_2$t-BuCp)$_2$]ZrCl$_2$, [Et(Ind)$_2$]ZrCl$_2$, [Et(2,4,7-Me$_3$Ind)$_2$]ZrCl$_2$, [Et(IndH$_4$)$_2$]ZrCl$_2$, [Me$_2$Si(Cp)(Me$_4$Cp)]ZrCl$_2$, (Cp)(Me$_4$Cp)]ZrCl$_2$, [Me$_2$Si(Ind)$_2$]ZrCl$_2$, [Ph$_2$Si(Ind$_2$]ZrCl$_2$, [Bz$_2$Si(Ind)$_2$]ZrCl$_2$, [Me$_2$Si(2,4,7-Me$_2$Ind)$_2$]ZrCl$_2$, [Me$_2$Si(IndH$_4$)$_2$]ZrCl$_2$, [Me$_2$Si(2-Me-4,6-i-Pr$_2$Ind)$_2$]ZrCl$_2$, [Me$_2$Si(2-Me-4-Ph-Ind)$_2$]ZrCl$_2$, [Me$_2$Si(2-Me-4,6-BEt$_2$Ind)$_2$]ZrCl$_2$, [Ph$_2$C(Ind)(Cp)]ZrCl$_2$, [Me$_2$C(Ind)(Cp)]ZrCl$_2$, [Me$_2$C(Ind)(3-MeCp)]ZrCl$_2$, [Ph$_2$C(Flu)(Cp)]ZrCl$_2$, [Me$_2$C(Flu)(Cp)]ZrCl$_2$, [Me$_2$Ge(2-Me-4-Ph-Ind)$_2$]ZrCl$_2$, (MeC$_5$H$_4$)$_2$HfCl$_2$, (EtC$_5$H$_4$)2 HfCl$_2$, (n-C$_3$H$_7$C$_5$H$_4$)$_2$ HfCl$_2$, (I-C$_3$H$_7$C$_5$H$_4$)$_2$HfCl$_2$, (n-BuC$_5$H$_4$)$_2$HfCl$_2$, (I-BuC$_5$H$_4$)$_2$HfCl$_2$, (t-BuC$_5$H$_4$)$_2$HfCl$_2$, [Et(Ind)$_2$]HfCl$_2$, [Me$_2$Si(Cp)Me$_4$Cp)]HfCl$_2$.

14. The catalyst according to claim 12, wherein component (3) is one or more selected from the group consisting of trimethyl aluminum, triethyl aluminum, tri-isobutyl aluminum, trioctyl aluminum., monohydro diethyl aluminum, monohydro di-isobutyl aluminum, sesquiethyl aluminum chloride and dichloro ethyl aluminum.

15. The catalyst according to claim 12, wherein component (3) is triethyl aluminum or tri-isobutyl aluminum.

16. The catalyst according to claim 12, wherein the molar ratio of Al in component (3) to Al in component (1) is in the range of about 1:50.

17. The catalyst according to claim 12, wherein the molar ratio of Al in component (1) to transition metal in component (2) is in the range of about 10:200.

18. The catalyst according to claim 12, wherein the molar ratio of Al in component (1) to transition metal in component (2) is in the range of about 40:60.

19. A method of olefin (co)polymerization comprising:
contacting the catalyst according to claim 12 with an olefin.

* * * * *

UNITED STATES PATENT AND TRADEMARK OFFICE
CERTIFICATE OF CORRECTION

PATENT NO. : 7,199,071 B2  Page 1 of 1
APPLICATION NO. : 10/450555
DATED : April 3, 2007
INVENTOR(S) : Zheng et al.

It is certified that error appears in the above-identified patent and that said Letters Patent is hereby corrected as shown below:

Col. 13, Line 46
In Claim #3, Line #11, please delete "100°" and insert -- 100° C --.

Col. 13, Line 64
In Claim #7, Line #2, please delete "seleded" and insert -- selected --.

Col. 14, Line 26
In Claim #9, Line #6, please delete "fielding" and insert -- yielding --.

Col. 14, Line 58
In Claim #12, Line #15, please delete "SIR $R^3$" and insert -- SiR $R^3$ --.

Col. 14, Line 63
In Claim #12, Line #20, please delete "AIR$_n$X$_{ns}$" and insert -- AlR$_n$X$_{ns}$ --.

Col. 15, Line 5
In Claim #13, Line #8, please delete "(1,2-dimehyl $C_2H_3$)" and insert -- (1,2-dimehyl $C_2H_2$) --.

Col. 15, Line 20
In Claim #13, Line #23, please insert -- [Me$_2$C(Flu)(Cp)]HfCl$_2$ -- preceding "[Me$_2$Si(Cp)Me$_4$Cp)]HfCl$_2$".

Signed and Sealed this

Twenty-third Day of October, 2007

JON W. DUDAS
*Director of the United States Patent and Trademark Office*